(12) United States Patent
Carlson et al.

(10) Patent No.: US 11,235,641 B2
(45) Date of Patent: Feb. 1, 2022

(54) THERMAL SYSTEM CONTROL FOR A VEHICLE

(71) Applicant: GM GLOBAL TECHNOLOGY OPERATIONS LLC, Detroit, MI (US)

(72) Inventors: Michael H. Carlson, Farmington Hills, MI (US); Lawrence P. Ziehr, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 11 days.

(21) Appl. No.: 16/890,647

(22) Filed: Jun. 2, 2020

(65) Prior Publication Data
US 2021/0370745 A1    Dec. 2, 2021

(51) Int. Cl.
*B60H 1/32* (2006.01)
*B60H 1/14* (2006.01)
*B60H 1/00* (2006.01)
*B60L 58/26* (2019.01)

(52) U.S. Cl.
CPC ......... *B60H 1/143* (2013.01); *B60H 1/00278* (2013.01); *B60H 2001/00928* (2013.01); *B60L 58/26* (2019.02)

(58) Field of Classification Search
CPC .............. B60H 1/143; B60H 1/00278; B60H 2001/00928; B60L 58/26
USPC ........................................................ 62/244
See application file for complete search history.

(56) References Cited

U.S. PATENT DOCUMENTS

| | | | |
|---|---|---|---|
| 2013/0166119 A1* | 6/2013 | Kummer ................. | B60L 58/26 701/22 |
| 2016/0361990 A1* | 12/2016 | Porras ..................... | B60L 53/14 |
| 2017/0087957 A1* | 3/2017 | Blatchley ........... | B60H 1/00278 |

FOREIGN PATENT DOCUMENTS

DE    112013001769 T5    2/2015

OTHER PUBLICATIONS

German Office Action for application No. 10 2021 107 772.9 dated Nov. 5, 2021, 8 pages.

* cited by examiner

*Primary Examiner* — Davis D Hwu

(57) ABSTRACT

A vehicle includes a thermal energy management system with first and second thermal fluid loops. The first thermal fluid loop includes a coolant pump configured to circulate a coolant through a vehicle battery and a chiller. The second thermal fluid loop is configured to circulate a refrigerant through the chiller, a compressor, and at least one condenser. The controller is configured to control the thermal energy management system according to a passenger compartment cooling mode and a battery cooling mode. In the passenger compartment cooling mode the compressor is operated at a first power setting. In the battery cooling mode the compressor is operated at a second power setting and the chiller is controlled to transfer thermal energy from the first thermal fluid loop to the second fluid thermal loop. The second power setting is less than the first power setting.

11 Claims, 3 Drawing Sheets

THERMAL SYSTEM CONTROL FOR A VEHICLE

INTRODUCTION

The present disclosure relates to motor vehicle thermal management systems, and more specifically to systems and methods for controlling the operation of thermal energy sources and sinks within a motor vehicle. Emissions standards, environmental concerns, and operator perceptions of responsiveness, smoothness and noise, vibration, and harshness (NVH), as well as operator comfort dictate many of the ways in which thermal energy within a motor vehicle is controlled. Traditionally, efficiencies have been sought within the confines of the internal combustion engines (ICE) functioning as prime movers for motor vehicles. Such advances have generally taken the form of improving combustion efficiency (maximizing combustion energy conversion into motive force), scavenging combustion thermal energy to run heating/ventilation/air conditioning (HVAC) functions, scavenging braking kinetic energy for battery recharging, and the like. The scavenging functions are often performed on dedicated heating, cooling, or electrical circuits, leading to a relatively complex series of circuits, many of which function almost entirely independent of one another.

However, even though ICEs have, and will likely continue to become, more and more efficient, substantial quantities of thermal energy are generated by the ICEs, a significant amount of which is usually rejected to the vehicle's surroundings. That is, in an ICE-powered vehicle, a surplus of thermal energy is generated by the ICE and cannot be effectively or efficiently contained within the motor vehicle. Thus, a significant amount of so-called "high quality" thermal energy is often rejected from the motor vehicle to the atmosphere. In an attempt to mitigate the inefficient use of ICEs, and to lower emissions, reduce environmental impact, and improve responsiveness, smoothness, NVH, and operator comfort, motor vehicles are increasingly relying upon electrical power for both motivation as well as management of the passenger compartment environment. However, the increasing use of electrical power, as is produced by innovative propulsion systems such as hybrid systems, batteries, fuel cells and the like, has dramatically reduced the amount, and the quality of the thermal energy generated by vehicles equipped with such innovative propulsion systems.

Accordingly, while traditional systems and methods of thermal management originally designed for ICE systems can be applied to innovative propulsion systems such as battery electric vehicles (BEVs)—which rely primarily upon a battery and electric motor-generator for propulsion—the surplus of thermal energy is much smaller than in an ICE system. Therefore, while traditional systems and methods of thermal management can operate for their intended purpose in ICE systems, there is a need for improved systems and methods of thermal management for vehicles in which the use of ICEs is reduced, and/or eliminated entirely. Thus, there is a need for new and improved thermal management systems and methods which efficiently collect, store, and distribute thermal energy to vehicle systems that need such energy, while reducing hardware cost and complexity, improving reliability, and offering improved safety and redundancy, and reduced range anxiety for motor vehicle operators.

SUMMARY

A vehicle according to the present disclosure includes a passenger compartment, a thermal energy management system, and a controller. The thermal energy management system has first and second thermal fluid loops. The first thermal fluid loop includes a coolant pump configured to circulate a coolant through at least a vehicle battery and a chiller such that the first thermal fluid loop is configured to selectively transfer thermal energy among the vehicle battery and the chiller. The second thermal fluid loop is configured to circulate a refrigerant through at least the chiller, a compressor, and at least one condenser such that the second thermal fluid loop is configured to transfer thermal energy among the chiller and condenser. The controller is configured to control the thermal energy management system according to a passenger compartment cooling mode for cooling the passenger compartment and a battery cooling mode for cooling the battery. In the passenger compartment cooling mode the compressor is operated at a first power setting. In the battery cooling mode the compressor is operated at a second power setting and the chiller is controlled to transfer thermal energy from the first thermal fluid loop to the second fluid thermal loop. The second power setting is less than the first power setting.

In an exemplary embodiment, the second power setting is a minimum operational power setting for the compressor.

In an exemplary embodiment, the condenser is configured to transfer thermal energy from the second thermal fluid loop to ambient air, and the condenser is operable at a first air flow rate and a second air flow rate. The second air flow rate is greater than the first air flow rate. In the battery cooling mode the condenser is operated at the second air flow rate. In such embodiments, the second air flow rate may be a maximum passive air flow rate for the condenser.

In an exemplary embodiment, at the second power setting thermal fluid in the condenser is maintained in a subcritical state.

A method of controlling a thermal energy management system for a vehicle having a passenger compartment includes providing the thermal energy management system with first and second thermal fluid loops. The first thermal fluid loop includes a coolant pump configured to circulate a coolant through at least a vehicle battery and a chiller such that the first thermal fluid loop is configured to selectively transfer thermal energy among the vehicle battery and the chiller. The second thermal fluid loop is configured to circulate a refrigerant through at least the chiller, a compressor, and at least one condenser such that the second thermal fluid loop is configured to transfer thermal energy among the chiller and condenser. The method also includes, in response to a passenger compartment cooling request, automatically controlling the compressor at a first power setting via a controller. The method further includes, in response to a battery cooling request, automatically controlling the compressor at a second power setting and automatically controlling the chiller to transfer thermal energy from the first thermal loop to the second thermal loop via the controller. The second power setting is less than the first power setting.

In an exemplary embodiment, the second power setting is a minimum operational power setting for the compressor.

In an exemplary embodiment, the condenser is configured to transfer thermal energy from the second thermal fluid loop to ambient air. The condenser is operable at a first air flow rate and a second air flow rate, with the second air flow rate being greater than the first air flow rate. In such embodiments, the method also includes, in response to a battery cooling request, automatically controlling the condenser to operate at the second air flow rate via the controller. The second air flow rate may be a maximum passive air flow rate for the condenser.

In an exemplary embodiment, at the second power setting thermal fluid in the condenser is maintained in a subcritical state.

Embodiments according to the present disclosure provide a number of advantages. For example, thermal management systems according to the present disclosure may have reduced complexity, reduced cost, and reduced mass (and in turn increased range) relative to known solutions The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
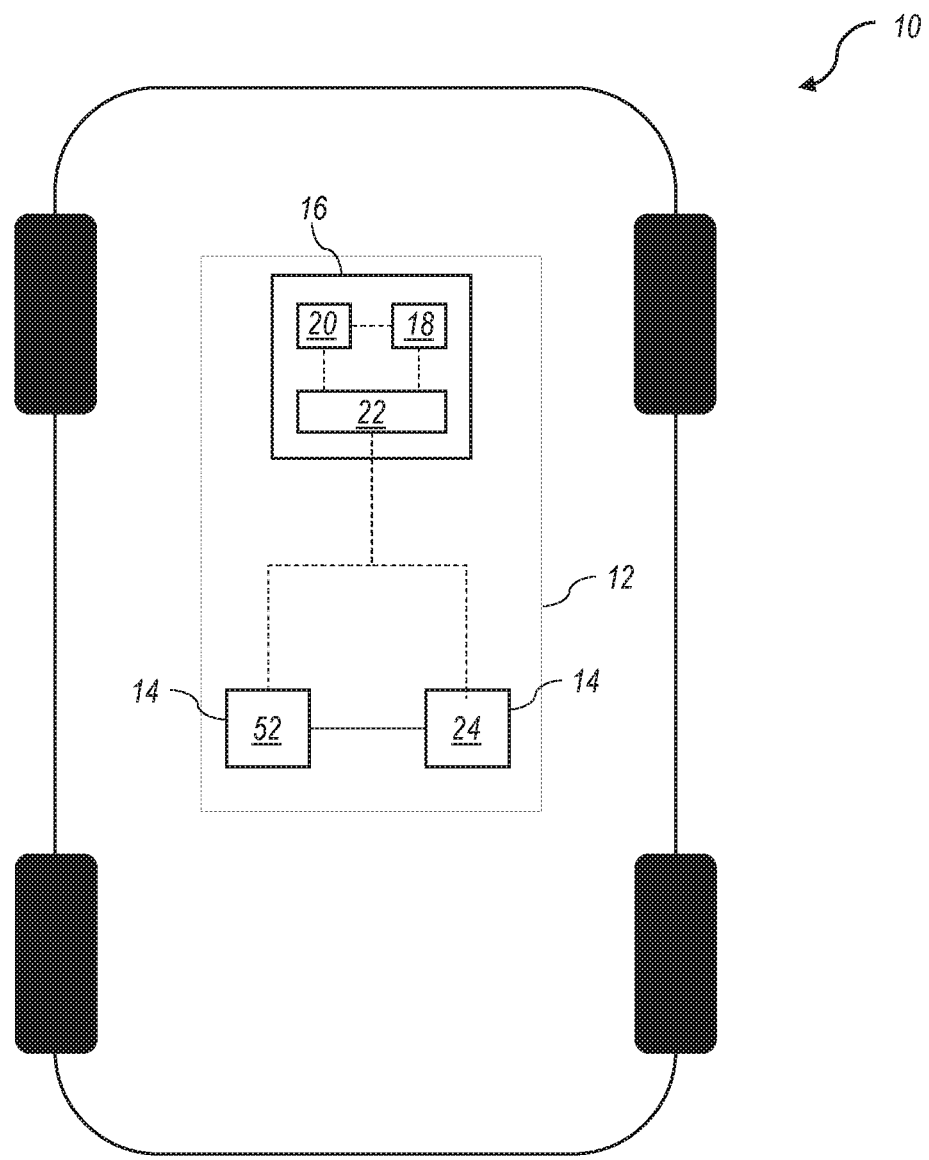
FIG. 1 is a schematic representation of a vehicle according to an embodiment of the present disclosure.

Referring to FIG. 1, a motor vehicle is shown and indicated generally by reference number 10. While the motor vehicle 10 is depicted as a car, it should be understood that the motor vehicle 10 may be a car, a truck, an SUV, a van, a semi, a tractor, a bus, a go-kart, or any other such motor vehicle 10 without departing from the scope or intent of the present disclosure. The motor vehicle 10 is equipped with a thermal management system 12. In broad terms, the thermal management system 12 operates to selectively transport thermal energy from a heat source within the thermal management system 12 to a heat sink in the thermal management system 12, or from a heat source or a heat sink to a location within the thermal management system 12 where the thermal energy is desired. The thermal management system 12 includes a plurality of dissimilar thermal fluid loops 14 for various motor vehicle 10 sub-systems. Each of the dissimilar thermal fluid loops 14 has heat sources and heat sinks associated with one or more of the motor vehicle 10 sub-systems. However, some heat sinks are significantly more massive, and therefore, capable of storing more thermal energy, than other heat sinks. Accordingly, depending on the thermal energy storage capacities of various heat sinks within the thermal management system 12, thermal energy may be moved from one of the dissimilar thermal fluid loops 14 to another.

As noted above, the vehicle 10 may circulate or transfer thermal energy via a reduced number of thermal fluid loops 14 in comparison to previous approaches. In the example illustrated in FIG. 1, the vehicle 10 circulates thermal energy generated onboard the vehicle only via the two fluid loops 14. In other words, the thermal requirements for the vehicle 10, i.e., any needs for heating or cooling of vehicle 10 components, as well as heating or cooling of the passenger compartment, may be met using only the two thermal fluid loops 14. Thermal energy may be transferred via the thermal fluid loops 14 by way of conduction, convection, or any other heat transfer mechanism that is convenient.

A controller 16 in electronic communication with a plurality of actuators, valves, and the like manages the operation of the thermal management system 12, including the plurality of dissimilar thermal fluid loops 14. The controller 16 is a non-generalized, electronic control device having a preprogrammed digital computer or processor 18, a memory or non-transitory computer readable medium 20 used to store data such as control logic, instructions, lookup tables, etc., and a plurality of input/output peripherals or ports 22. The processor 18 is configured to execute the control logic or instructions. The controller 16 may have additional processors or additional integrated circuits in communication with the processor 18 such as logic circuits for analyzing thermal management data. In some examples, the controller 16 may be better described as a plurality of controllers 16, each of which is designed to interface with and manage specific componentry within the motor vehicle 10, and each of the plurality of controllers 16 is in electronic communication with the others. However, while in some examples more than one controller 16 may be used, for ease of understanding, the following description will focus on a thermal management system 12 having only a single controller 16.

Figure 2:
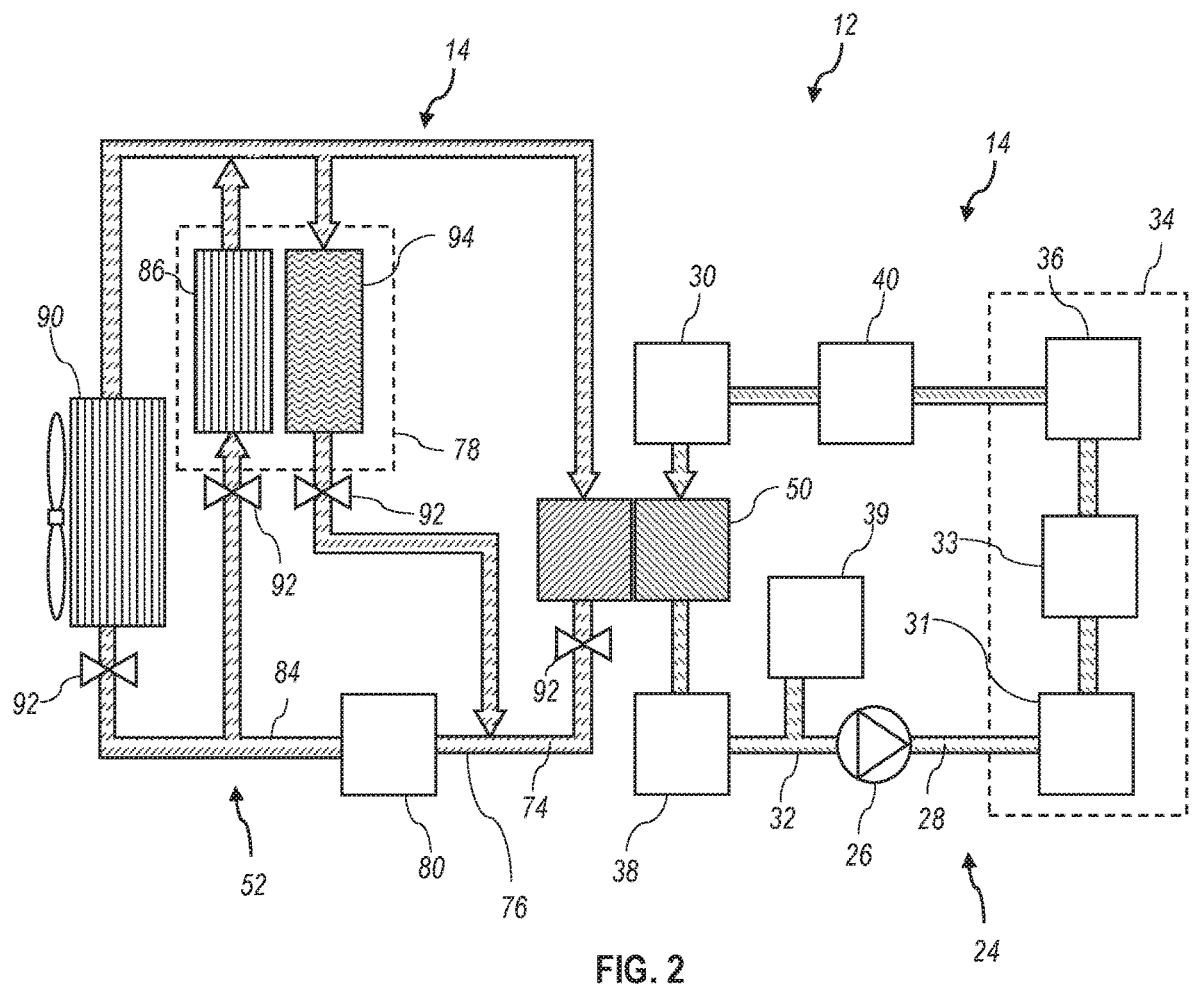
FIG. 2 is a schematic representation of a thermal management system according to an embodiment of the present disclosure.

Referring now to FIG. 2 and with continuing reference to FIG. 1, a first of the dissimilar thermal fluid loops 14 is a coolant loop 24. The coolant loop 24 includes a coolant pump 26 arranged to selectively pump coolant 28 from a coolant fill bottle 39 through a plurality of coolant conduits 32. The coolant conduits 32 are in fluid communication with a variety of coolant loop 24 components. In the illustrated embodiment, the coolant loop 24 components include an integrated power electronics (IPE) module 34. The IPE 34 is an electronic device having a variety of accessories usable by the motor vehicle operator. In the illustrated embodiment, the IPE 34 includes a power inverter/converter module 31, an accessory power module 33, and an onboard charging module (OBCM) 36. Other embodiments within the scope of the present disclosure may include one or more additional accessories in place of, or in addition to, those shown in FIG. 2. As the IPE 34 is operated, the electronics within the IPE 34 convert electrical energy into a variety of functions usable by the motor vehicle and/or operator. In addition, thermal energy is generated as a byproduct of using electrical energy within the IPE 34 devices. The coolant 28 carries the thermal energy from the IPE 34 devices elsewhere in the coolant loop 24.

As will be discussed further below, thermal energy from the IPE 34 devices may not be significant in output, and in this sense be relatively "low-quality" in comparison to sources such as an internal combustion engine. Nevertheless, as will be described further below, the thermal energy management system 12 may facilitate accumulation of such low-quality thermal energy, allowing it to be subsequently deployed to the passenger compartment or elsewhere in the vehicle 10 in a manner consistent with previous approaches using "high-quality" thermal energy sources such as internal combustion engines. Thus, despite the absence of an internal combustion engine in the vehicle 10, the thermal energy management system 12 may nevertheless have sufficient heating output.

The OBCM 36 is electrically coupled to a high-voltage battery 38. The OBCM 36 is an electrical device designed to move energy into a secondary cell or rechargeable battery 38 by forcing an electrical current through the battery 38. In some examples, a single-phase 3.5 kW to 22 kW OBCM 36 is installed within the electrical system of the motor vehicle 10 and charges the motor vehicle 10 battery 38 from a power grid. In other examples, the battery 38 of the motor vehicle 10 can be used as an energy source, and therefore, the OBCM 36 can also direct electrical energy to the electrical grid, or to accessory or ancillary devices within the motor vehicle 10. In addition, the OBCM 36 can also direct electrical energy to devices, such as cellular phones, and the like that an operator of the motor vehicle 10 may power from electrical connections within the IPE 34 of the motor vehicle 10. Thus, in some instances, the OBCM 36 is a bi-directional battery 38 charging and discharging device.

In many instances, the battery 38 is most efficiently charged when the battery 38 is heated to a predetermined target temperature. In one aspect, the predetermined target temperature is approximately 25° Celsius. However, depending on the componentry and the thermal requirements of the thermal management system 12 components, the predetermined target temperature of the battery 38 may vary. In one example, to achieve the target temperature range, the battery 38 can be heated electrically via electrical energy supplied by the OBCM 36. In the example, the controller 16 effectively overdrives the OBCM 36 or drives the OBCM 36 in a calculatedly inefficient manner so as to convert a predetermined amount of electrical energy into thermal energy, e.g., to raise the temperature of the battery 38. In another example, the battery 38 itself is charged in a calculatedly inefficient manner. That is, the battery 38 is charged inefficiently so that a portion of the electrical energy being driven into the battery 38 by the OBCM 36 is converted into thermal energy which is then stored within the mass of the battery 38 while the battery 38 is being charged. In yet another example, thermal energy is directed to the battery 38 via coolant 28 carried by the coolant loop 24 from other heat sources within and external to the coolant loop 24. In the illustrated embodiment, the coolant loop 24 includes a coolant heater 30. The coolant heater 30 is an electrically-powered heater that adds thermal energy to the flow of coolant 28, thereby aiding in bringing the battery 38 up to an optimal charging temperature. In some examples, once the battery 38 has been electrically charged sufficiently, and charged sufficiently with thermal energy the temperature of the battery 38 is regulated by the OBCM 36.

The battery 38 is electrically coupled to a motor 40. The motor 40 is configured to selectively provide drive torque to vehicle wheels, e.g. through a transmission. When providing drive torque, energy stored in the battery 38 is provided to the electric motor 40 and converted to drive torque. In some embodiments of motor vehicles 10 having regenerative braking systems, the electric motor 40 is also used as an electric generator. Under circumstances when the controller 16 and OBCM 36 determine that the battery 38 is fully charged or additional heating is otherwise desired, the electricity generated by the electric motor 40 can be converted into thermal energy and stored in the mass of the battery 38 or other thermal management system 12 components.

The coolant loop 24 additionally directs coolant 28 through a chiller 50 disposed in the second of the dissimilar thermal fluid loops 14, in particular, a refrigerant loop 52. The chiller 50 is a heat exchange device providing a means of thermal energy transfer between the coolant loop 24 and the refrigerant loop 52. The chiller 50 includes at least two passageways physically separated from one another. That is, on a first side of the chiller 50, a coolant 28 passageway (not shown) carries coolant 28 through the chiller 50 as a part of the coolant loop 24. On a second side of the chiller 50, a refrigerant passageway (not shown) carries a refrigerant 74 through the chiller 50 as a part of the refrigerant loop 52. However, it should be understood that despite the fact that the chiller 50 includes both a portion of the coolant loop 24 and the refrigerant loop 52, there is no fluid interface between coolant 28 and refrigerant 74 within the chiller 50, and thus the coolant 28 and refrigerant 74 are prevented from mixing.

The refrigerant loop 52 includes a plurality of refrigerant conduits 76 fluidly connecting a plurality of devices operable to thermally regulate a passenger compartment (not specifically shown) contained within the motor vehicle 10. The passenger compartment may be thermally isolated from other vehicle components generating heat, and may receive flows of thermal energy via one or more vents or other conduits (not specifically shown) of the HVAC system 78. The refrigerant loop 52 also carries thermal energy to and from the coolant loop 24 via the chiller 50. The refrigerant loop 52 includes a variety of operator comfort systems such as a heating, ventilation, and air conditioning (HVAC) system 78. Fundamentally, the refrigerant loop 52 has a heating function and a cooling function. Within the refrigerant loop 52, the HVAC system 78 provides heated and/or cooled air to a passenger compartment of the motor vehicle 10. Stated another way, the HVAC system 78 transports thermal energy from a cooler location to a warmer location within the refrigerant loop 52. In several aspects, the HVAC system 78 functions as a heat pump. That is, the HVAC system 78 is an air conditioner in which both heating and cooling functions are possible.

In an exemplary mode of operation, the operator of the motor vehicle 10 determines a desired passenger compartment air temperature and selects a heating cycle for the HVAC system 78. The HVAC system 78 includes a compressor 80. The refrigerant 74 enters the compressor 80 via a refrigerant conduit 76 known as a suction line 82. The compressor 80 compresses gaseous refrigerant 74, thereby increasing the temperature and pressure of the refrigerant 74. The now high-pressure, high-temperature refrigerant 74 then leaves the compressor 80 via a refrigerant conduit 76 known as a discharge line 84 and flows into a cabin condenser 86. In some aspects, the cabin condenser 86 is a heat exchange device having a plurality of condenser coils through which the refrigerant 74 flows. The coils are in contact with the passenger compartment atmosphere. An HVAC blower or fan (not shown) blows air over the cabin condenser 86, thereby releasing thermal energy from the condenser 86 into the passenger compartment atmosphere. In some aspects, the refrigerant loop 52 includes a second or exterior condenser 90. The exterior condenser 90 is in contact with the atmosphere external to the motor vehicle 10 and when engaged, releases thermal energy from the refrigerant 74 from the motor vehicle 10 to the atmosphere.

The HVAC system 78 further includes a plurality of expansion valves 92. Depending on the HVAC system 78 design parameters, the expansion valves 92 may be mechanical thermostatic expansion valves (TXV) (not specifically shown) and/or electronic expansion valves (EXV) (not specifically shown). Control over the rate of refrigerant 74 expansion can be more directly and precisely controlled with EXVs than with TXVs, however in some cases it is desirable to use TXVs for reasons of cost, simplicity, and so forth. Condensed, pressurized, and still somewhat warm refrigerant 74 received from the cabin condenser 86 and/or exterior condenser 90 is routed through an expansion valve 92. As the refrigerant 74 is de-pressurized by the expansion valve 92, the refrigerant 74 cools. The refrigerant 74 then passes through an evaporator 94. The evaporator 94 is a heat exchange device in which a series of refrigerator coils (not shown) carry a flow of cooled refrigerant 74. The refrigerator coils exchange thermal energy with the passenger compartment atmosphere. The HVAC blower or fan blows air over the cabin evaporator 94 thereby cooling the passenger compartment of the motor vehicle 10. The refrigerant 74, having passed through the evaporator 94 is then directed back through the compressor 80. Refrigerant 74 is also selectively passed through an expansion valve 92 downstream of the chiller 50 where thermal energy is either obtained from or released to the coolant loop 24, depending on the relative temperatures of the coolant 28 and the refrigerant 74, and the thermal requirements of the battery 38 and other thermal management system 12 componentry.

In one example, the HVAC system 78 can be operated intermittently or continuously by occupants in the passenger compartment, or by the controller 16 depending on optimal heating and/or cooling requirements of the passenger compartment, or optimal heating and/or cooling requirements of other thermal management system 12 components. In one example, the HVAC system 78 operates continuously as a heat pump. As previously discussed, while operating as a heat pump, the HVAC system 78 directs refrigerant 74 through the cabin condenser 86, thereby rejecting the thermal energy in the refrigerant 74 to the passenger compartment and cooling the refrigerant 74. While refrigerant 74 passing through the cabin condenser 86 and the exterior condenser 90 rejects thermal energy, thermal energy is obtained as the refrigerant 74 passes through the chiller 50. Similarly, in a second example, the controller 16 directs refrigerant 74 through the exterior condenser 90 where the refrigerant 74 is cooled by rejecting thermal energy to the atmosphere, but because the refrigerant 74 also flows through the chiller 50, thermal energy is transferred is obtained as the refrigerant 74 passes through the chiller 50.

Conventional vehicles having an internal combustion engine may include one or more additional fluid circuit loops, e.g. a lubricant loop for the internal combustion engine. However, in the illustrated embodiment of a battery electric vehicle 10, no internal combustion engine is provided and therefore no such loops are present.

Prior art thermal management systems teach the inclusion of a passive cooling mechanism in the coolant loop 24. As an example, such thermal management systems would include a radiator for exchanging thermal energy between the coolant 28 and the atmosphere external to the motor vehicle 10. While such passive cooling mechanisms may reject thermal energy from the motor vehicle 10, they also contribute weight and cost to the thermal management system.

As may be seen, embodiments according to the present disclosure omit such a passive cooling mechanism. Rather, as will be described in further detail below with respect to FIG. 3, embodiments according to the present disclosure employ a novel control scheme to achieve high-coefficient of Performance (CoP) cooling via the refrigerant loop without a passive cooling mechanism in the coolant loop.

Figure 3B:
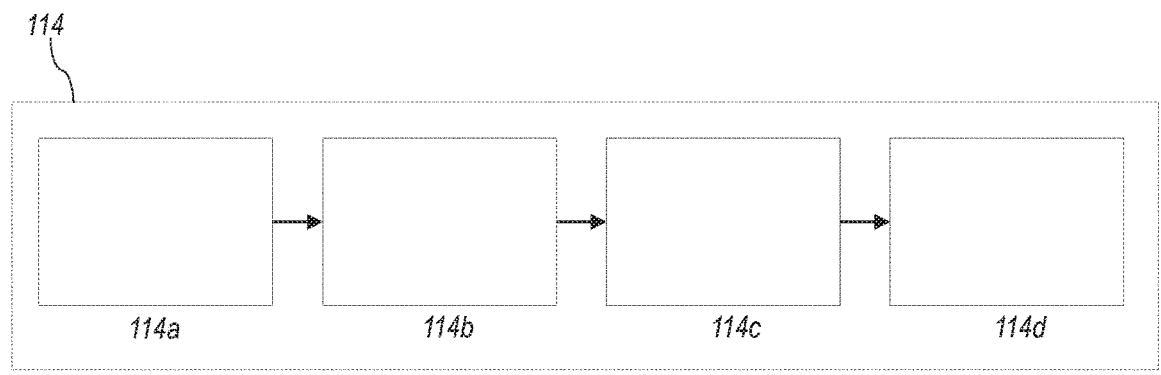
FIGS. 3A and 3B are flowchart representations of a method of controlling a thermal management system according to an embodiment of the present disclosure.
Figure 3A:
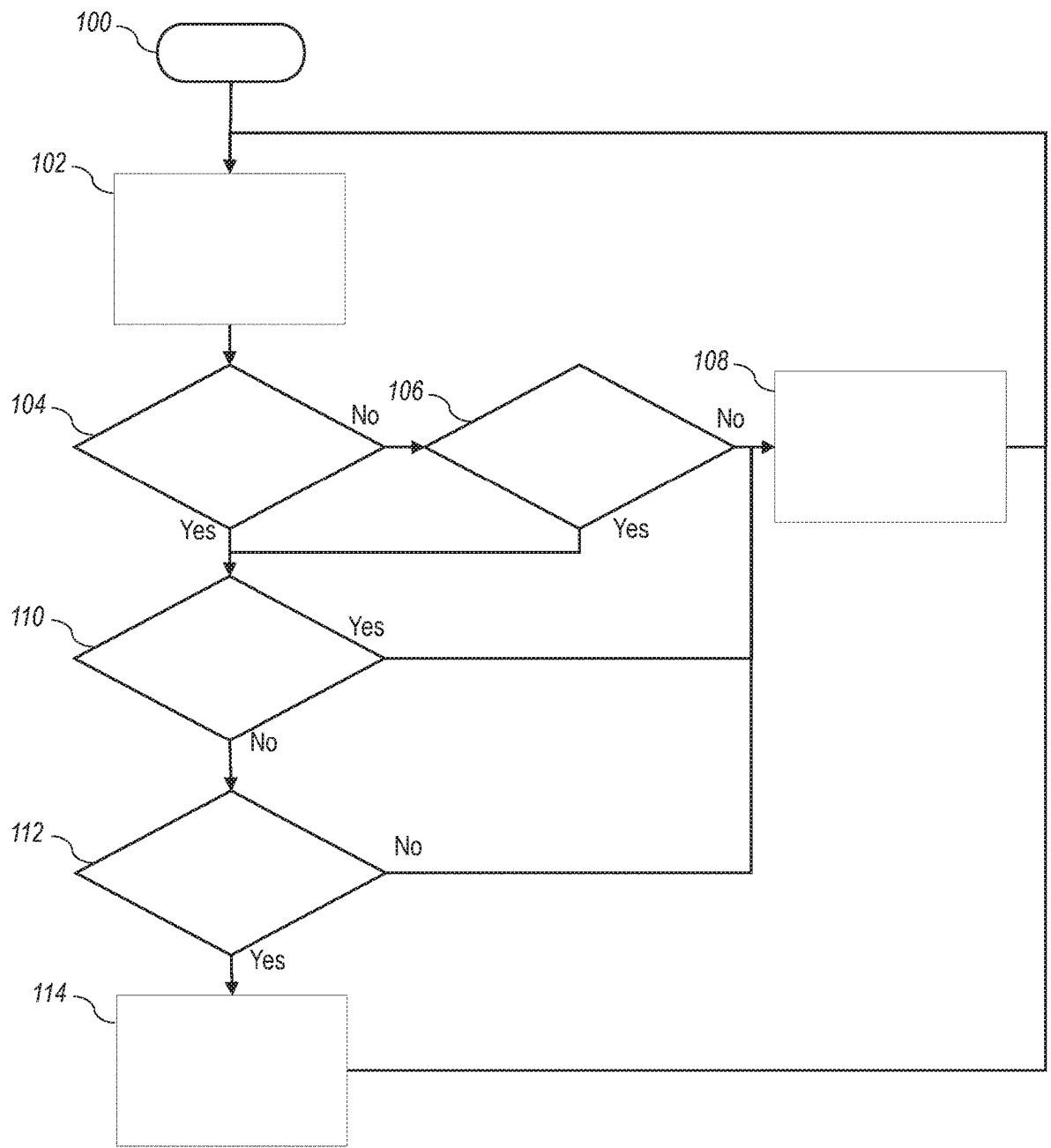

Referring now to FIG. 3, a method of controlling a thermal management system, e.g. the thermal management system 12, is illustrated in flowchart form. In general terms, the controller 16 manages the functions of the coolant loop 24 and the refrigerant loop 52 via the chiller 50 to transfer thermal energy to devices within the motor vehicle 10 where the thermal energy is needed.

The thermal management method begins at block 100 where a continuous thermal management system 12 control loop is initiated.

The method proceeds to block 102 where the controller 16 calculates a critical temperature of one or more components of the thermal management system 12. Such components may include the battery 38, motor 40, IPE 34, and other components in the thermal management system 12. The critical propulsion temperature refers to a temperature where the measured temperature for a given component exceeds the optimum range for the component and is approaching an overheat condition. The calculation of the critical temperature may be based a variety of factors including, but not limited to, a rate of temperature increase, vehicle loads, customer operating modes, and other factors. In some embodiments, the critical temperature may be defined such that when exceeded, the controller 16 is configured to prioritize cooling over energy consumption. The controller 16 additionally determines a current temperature of the one or more components, e.g. via thermal sensors attached to such components or other suitable means.

The method proceeds to operation 104, in which a determination is made of whether the current temperature of one or more components of the thermal management system 12 is greater than the calculated critical temperature for that component.

In response to the determination of operation 104 being negative, i.e. the current temperature not exceeding the critical temperature for any components of the thermal management system 12, then the method proceeds to operation 106 where a determination is made of whether the criteria for an opportunity cooling mode are satisfied. Opportunity cooling refers to a mode wherein, while the critical temperature is not presently exceeded, future cooling needs may be anticipated and conditions for cooling are available. The criteria for the opportunity cooling mode may include ambient temperature limits, front end airflow, current temperatures of various components of the thermal management system 12, estimated temperature based on load, and lower and upper limits of desired operating temperatures of the various components of the thermal management system 12

In response to the determination of operation 106 being negative, i.e. opportunity cooling mode criteria are not satisfied, then the controller 16 operates the thermal management system 12 according to a standard thermal operation mode as illustrated at block 108. An example of such standard operation is described in co-pending U.S. patent application Ser. No. 16/100,639.

The method then returns to block 102, such that the method is a continuous loop.

In response to the determination of either operation 104 or 106 being positive, i.e. the current temperature exceeds the critical temperature or opportunity cooling being available, the method proceeds to operation 110. At operation 110, the controller 16 determines whether a cabin thermal change is currently being requested. A cabin thermal change refers to a request for heating or cooling of an occupant cabin. In response to the determination of operation 110 being positive, the method proceeds to block 108 as described above.

In response to the determination of operation 110 being negative, i.e. no cabin thermal change being requested, then the method proceeds to operation 112. At operation 112, the controller determines whether a difference between a temperature of coolant 28 at the inlet to the chiller 50 and an ambient temperature in the vicinity of the vehicle 10 exceeds a predefined threshold. The predefined threshold refers to a non-zero positive value defined using a cost function based on front-end airflow, calculated to ensure adequate thermal transfer between the coolant 28 and ambient air in the vicinity of the vehicle 10. In an exemplary embodiment, the threshold may be established in the range of 7° to 10° C.

In response to the determination of operation 112 being negative, the method proceeds to block 108 as described above.

In response to the determination of operation 112 being positive, i.e. the difference between the temperature of coolant 28 at the inlet to the chiller 50 and the ambient temperature being at least equal to the predefined threshold, then the refrigerant loop is controlled according to an increased CoP mode, as illustrated at block 114. The increased CoP mode is described in further detail in FIG. 3b. Control then returns to block 102.

As shown in FIG. 3b, in the increased CoP mode of operation, front airflow to the exterior condenser 90 is controlled to increase, as illustrated at block 114a. In an exemplary embodiment, this is performed by controlling a shutter system to open and increase airflow to the exterior condenser 90. The shutter system may be opened fully to maximize passive airflow to the exterior condenser 90. In some embodiments, a front end fan associated with the exterior condenser 90 may also be activated to further increase airflow by active means. In such embodiments, the fans may be controlled at a low power setting to minimize power consumption.

The controller 16 subsequently controls the compressor 80 at a reduced power setting, as illustrated at block 114b. In an exemplary embodiment, at the reduced power setting the refrigerant 74 being maintained in a subcritical state, i.e. no phase change from liquid to gas occurring during compression. In an exemplary embodiment, the reduced power may be a minimum operational power of the compressor 80, i.e. the lowest non-zero power at which the compressor 80 is configured to operate.

The electronic expansion valve (EXV) for the chiller 50 is then engaged to facilitate heat transfer between the coolant 28 and the refrigerant 74, as illustrated at block 114c.

An optimized superheat target for the EXV is then calculated and updated, as illustrated at block 114d. In an exemplary embodiment, the superheat target is calculated based on a desired thermal transfer between the coolant 28 and the refrigerant 28, e.g. using a cost function to determine a heat transfer rate to maximize the COP. The controller may thereafter control the EXV and set the valve target to that calculated superheat target value.

The example thermal energy management system 12 advantageously may transfer thermal energy amongst the two thermal fluid loops, as noted above. In this manner, excess thermal energy from thermal sources such as the vehicle battery 38 or other electronics may rejected to the atmosphere via the refrigerant loop 52 with relatively low energy consumption. By contrast, in previous approaches to vehicle heating systems it would be necessary to provide a separate radiator within the coolant loop 24. Embodiments according to the present disclosure thereby have reduced complexity, reduced cost, reduced mass (and in turn increased range), and reduced noise and vibrations relative to known solutions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle, comprising:
   a passenger compartment;
   a thermal energy management system having first and second thermal fluid loops, the first thermal fluid loop including a coolant pump configured to circulate a coolant through at least a vehicle battery and a chiller such that the first thermal fluid loop is configured to selectively transfer thermal energy among the vehicle battery and the chiller, the second thermal fluid loop being configured to circulate a refrigerant through at least the chiller, a compressor, and at least one condenser such that the second thermal fluid loop is configured to transfer thermal energy among the chiller and condenser; and
   a controller configured to control the thermal energy management system according to a passenger compartment cooling mode for cooling the passenger compartment and a battery cooling mode for cooling the battery, wherein in the passenger compartment cooling mode the compressor is operated at a first power setting and wherein in the battery cooling mode the compressor is operated at a second power setting and the chiller is controlled to transfer thermal energy from the first thermal fluid loop to the second fluid thermal loop, the second power setting being less than the first power setting.

2. The vehicle of claim 1, wherein the second power setting is a minimum operational power setting for the compressor.

3. The vehicle of claim 1, wherein in the condenser is configured to transfer thermal energy from the second thermal fluid loop to ambient air, the condenser being operable at a first air flow rate and a second air flow rate, the second air flow rate being greater than the first air flow rate, and wherein in the battery cooling mode the condenser is operated at the second air flow rate.

4. The vehicle of claim 3, wherein the second air flow rate is a maximum passive air flow rate for the condenser.

5. The vehicle of claim 1, wherein the first thermal fluid loop is a coolant loop and the second thermal fluid loop is a refrigerant loop.

6. The vehicle of claim 1, wherein at the second power setting thermal fluid in the condenser is maintained in a subcritical state.

7. A method of controlling a thermal energy management system for a vehicle having a passenger compartment, the method comprising:

providing the thermal energy management system with first and second thermal fluid loops, the first thermal fluid loop including a coolant pump configured to circulate a coolant through at least a vehicle battery and a chiller such that the first thermal fluid loop is configured to selectively transfer thermal energy among the vehicle battery and the chiller, the second thermal fluid loop being configured to circulate a refrigerant through at least the chiller, a compressor, and at least one condenser such that the second thermal fluid loop is configured to transfer thermal energy among the chiller and condenser;

in response to a passenger compartment cooling request, automatically controlling the compressor at a first power setting via a controller; and in response to a battery cooling request, automatically controlling the compressor at a second power setting and automatically controlling the chiller to transfer thermal energy from the first thermal loop to the second thermal loop via the controller, wherein the second power setting is less than the first power setting.

8. The method of claim 7, wherein the second power setting is a minimum operational power setting for the compressor.

9. The method of claim 7, wherein in the condenser is configured to transfer thermal energy from the second thermal fluid loop to ambient air, the condenser being operable at a first air flow rate and a second air flow rate, the second air flow rate being greater than the first air flow rate, the method further comprising, in response to a battery cooling request, automatically controlling the condenser to operate at the second air flow rate via the controller.

10. The method of claim 9, wherein the second air flow rate is a maximum passive air flow rate for the condenser.

11. The method of claim 7, wherein at the second power setting thermal fluid in the condenser is maintained in a subcritical state.

* * * * *